June 2, 1925.

S. J. LEMAY 1,540,025

CHRISTMAS TREE HOLDER

Filed April 2, 1924

INVENTOR.
Simeon J. Lemay
BY
Gardner W. Pearson
ATTORNEY.

Patented June 2, 1925.

1,540,025

UNITED STATES PATENT OFFICE.

SIMEON J. LEMAY, OF LOWELL, MASSACHUSETTS.

CHRISTMAS-TREE HOLDER.

Application filed April 2, 1924. Serial No. 703,809.

*To all whom it may concern:*

Be it known that I, SIMEON J. LEMAY, a citizen of the United States, residing at Lowell, in the county of Middlesex and State of Massachusetts, have invented certain new and useful Improvements in Christmas-Tree Holders, of which the following is a specification.

My invention has for its object to provide a strong, simple and durable Christmas tree stand which has three points of contact with the floor and in which all parts are firmly fastened together so that none can be lost while the whole construction is elastic in some parts so that it automatically adjusts itself to trees of different diameters.

In the drawings, Figure 1 is an elevation of my stand before the tree is put in place.

Figure 1:
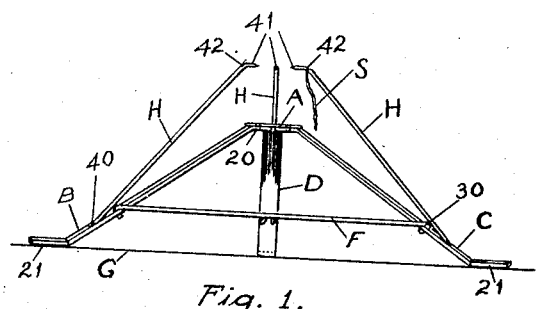

In the drawings, G represents the ground or floor and T represents a tree, or the butt-end of a tree.

A represents a disc shaped head, preferably made of metal, in the center of which is a hole 10, through which passes a vertical pin 11. This pin may be soldered or welded into place or may be separate and merely driven through hole 10, by means of a hammer, into the base of tree T.

12, 12, 12, represents three vertical pivots passing through head A for the three spring metal legs B, C, D, which extend diagonally downward from their tops 20, through each of which a pivot 12 passes to their bottom ends or feet 21.

In each leg medially is a hook hole 22, beside which is a pivot hole 23 for the hooks F, F, F, so pivoted, each in a hole 22, that it will swing in a plane substantially parallel with the leg to which it is pivoted, and of such length that it extends to an adjoining leg, and terminates in a finger 31 which engages a hole 23 in said adjoining leg.

Figure 5:
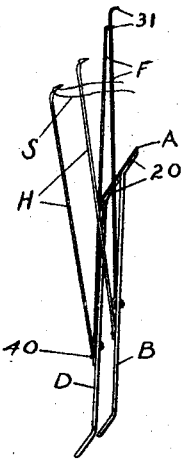
Fig. 5 is a side elevation of my stand when folded.

I prefer to pivot each hook F to a leg by forming the special loop 30 which passes through a hook pivot hole 22, such loop being bent around to form a ring of sufficient size to allow the hook to swing around in a plane at right angles to its leg, but cut away at the end so that it will fold or swing in a plane, substantially parallel with its leg whereby it will help to form a compact package when folded, as shown in Fig. 5.

As above described, the stand will hold firmly in position, but to hold the tree firmly in place on head A, I use three elastic brace rods H, H, H, each so pivoted on a pivot 40, to a leg B, C, D, as to swing in a plane at an acute angle therewith. This angle is such, and the length of each rod is such that its upper end, which is bent towards head A and terminates in a sharp prong 42, will be in a position to enter the tree T when it is placed on head A.

Figure 2:
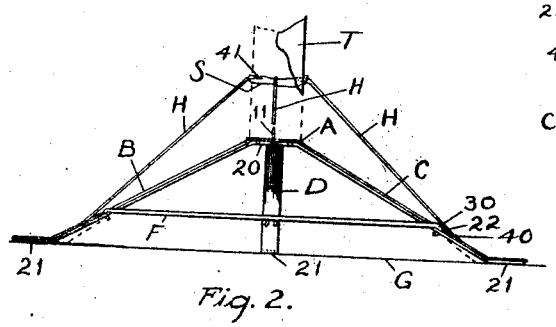
Fig. 2 is an elevation similar to Fig. 1 of my stand showing the position of the parts when a tree, indicated partly by dotted lines, is in place on the stand with parts suitably fastened.
Figure 3:
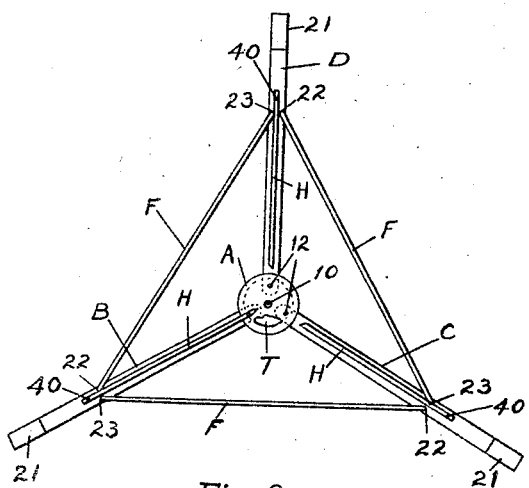
Fig. 3 is a plan of Fig. 2, a tree being indicated partly by dotted lines.

As shown in Fig. 2 the weight of the tree will tend to spread the feet 21 of the legs, and to force the prongs 41 inward, toward the tree, but as the brace rods H are preferably somewhat elastic it is obvious that trees of larger or smaller butts can be inserted between the prongs 41 and forced down on pin 11 and head A, the prongs 41 then being pressed or driven into the tree as braces.

To hold the parts more firmly in position I prefer to cut slight grooves 42 in the outer side of each brace H for a retaining wire or cord S which may be permanently tied on to one brace and when the tree is in position, can have its ends brought around through the other grooves in the other two braces, the ends being tied or twisted so that the prongs 42 cannot come out.

Figure 6:
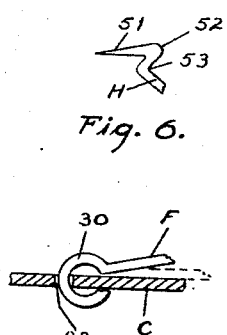
Fig. 6 is a detail of an alternative form of brace prong.
Figure 7:
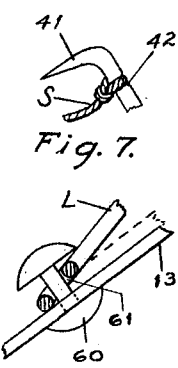
Fig. 7 is a detail of one type of brace prong.
Figure 8:
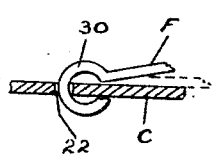
Fig. 8 is a detail of the pivot loop of one of the hooks.

As shown in Fig. 6, instead of groove 42 I may bend back the tip of each brace H at 52 forming what amounts to a groove 53, then bend forward the pointed tip 51, forming a sort of gooseneck. In this construction the part 52 is of such shape that it may be struck by a hammer to drive in point 51.

Figure 4:
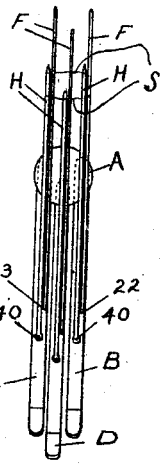
Fig. 4 is a plan view of my stand when folded.

As shown in Figs. 4 and 5, when not in use, the fingers 31 can be removed from the holes 23 of hooks F on account of the form of loop 30, and will fold flat, each against a leg while the brace rods H extending at a slight angle with each leg will come in together when the legs are swung together on their pivots 12.

The cord or wire S can be used to tie up the parts and hold them in place.

Figure 9:
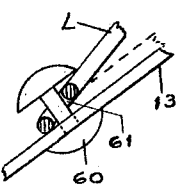
Fig. 9 shows a brace with a loose vertical pivot.

By using the cord S and grooves 42 or 53 I can use braces such as L shown in Fig. 9 instead of H, each pivoted loosely on a stud 60 passing through a loop 61. Such a brace will lie flat on its leg B as shown by the dotted lines. Pin 11 may be a nail driven through hole 10 instead of being fixed as head A is lifted enough from the floor to allow a hammer to be used underneath.

I claim:

1. A Christmas tree stand comprising a head with a vertical pin on which the base of the tree is adapted to rest; three legs pivoted on vertical pivots under said head and extending diagonally downwardly; hooks so pivoted medially to each of said legs as to swing in a plane substantially parallel therewith and each extending to an adjoining leg and engaging a hole therein; and elastic brace rods, each so pivoted to a leg, and of such length as to extend above and beyond the head, and each having an upper end bent towards the head and terminating in a prong in position to enter the tree, each brace having on its outer side a groove for a retaining cord.

2. A Christmas tree stand comprising a head; three legs pivoted thereto on vertical pivots and extending diagonally downward; hooks pivoted medially and detachably connecting adjoining legs; and brace rods each so pivoted to a leg and of such length as to extend above and beyond the head and terminating in a bent pointed prong.

SIMEON J. LEMAY.